Sept. 14, 1937.   H. C. BRANCATI   2,093,230
SIGNALING DEVICE FOR USE IN CONNECTION WITH CLOSED MOTOR VEHICLES
Filed May 6, 1936   2 Sheets-Sheet 1
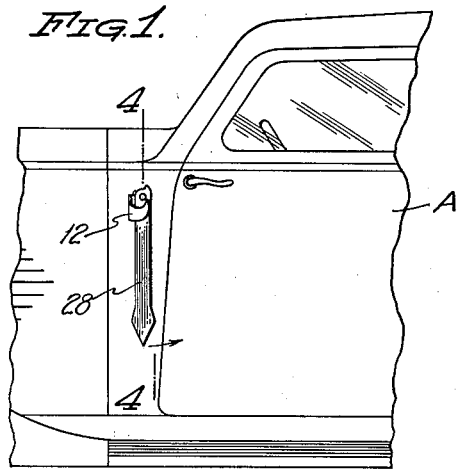
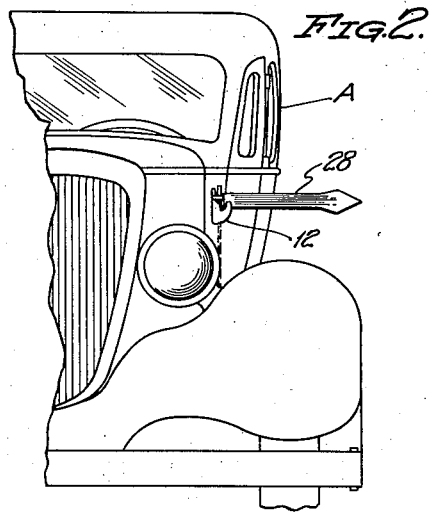
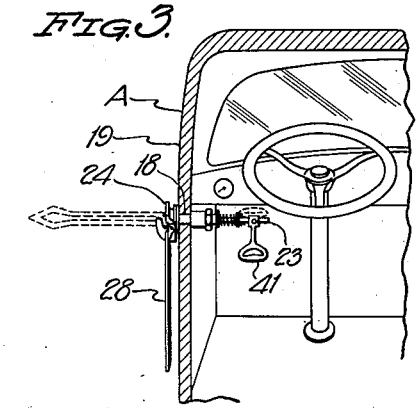
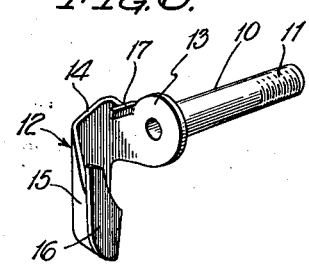
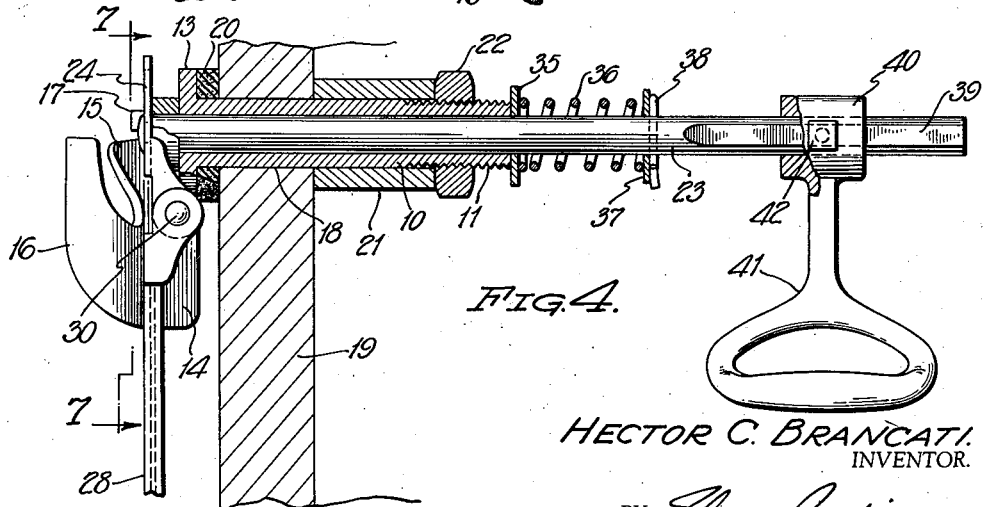
HECTOR C. BRANCATI.
INVENTOR.

Sept. 14, 1937.   H. C. BRANCATI   2,093,230
SIGNALING DEVICE FOR USE IN CONNECTION WITH CLOSED MOTOR VEHICLES
Filed May 6, 1936   2 Sheets-Sheet 2
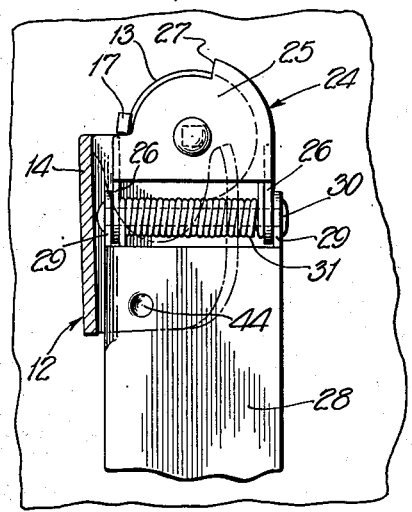
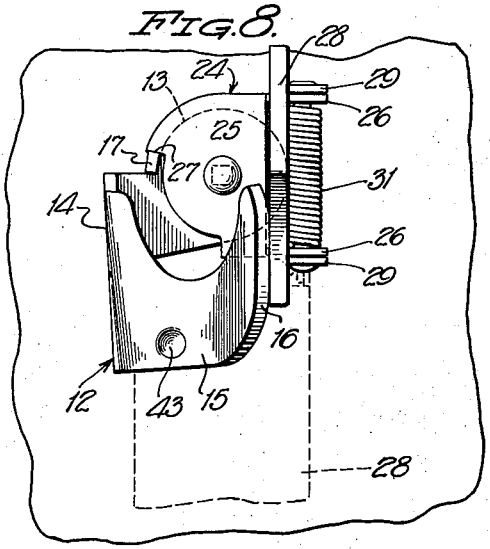
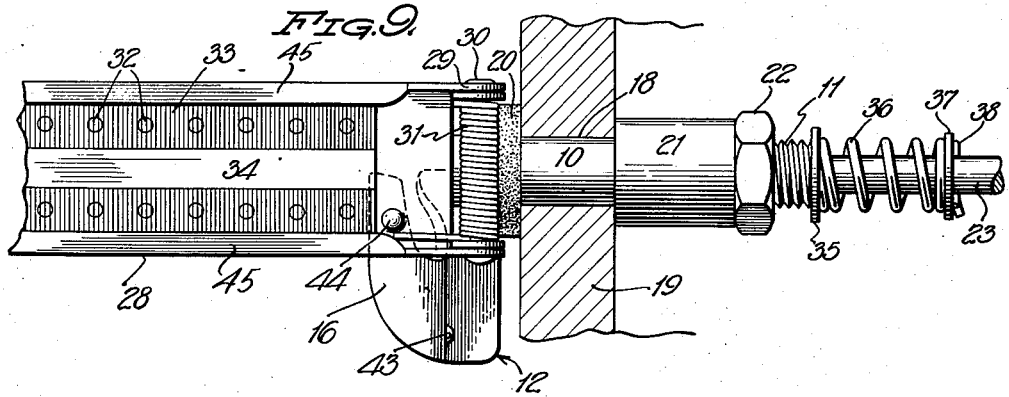
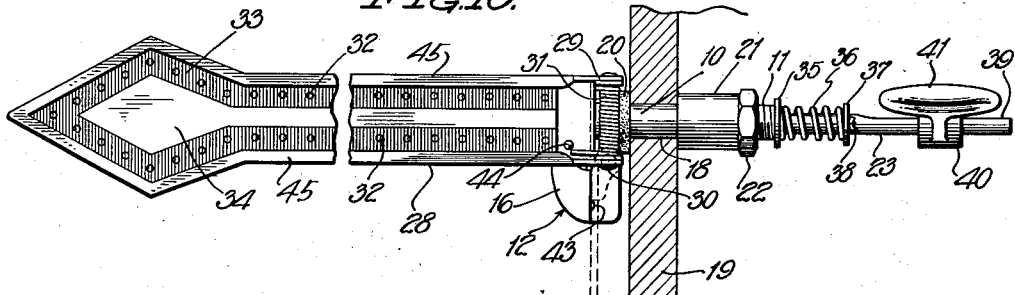
HECTOR C. BRANCATI.
INVENTOR.

Patented Sept. 14, 1937

2,093,230

UNITED STATES PATENT OFFICE 2,093,230

SIGNALING DEVICE FOR USE IN CONNECTION WITH CLOSED MOTOR VEHICLES

Hector C. Brancati, New York, N. Y.

Application May 6, 1936, Serial No. 78,280

8 Claims. (Cl. 116—52)

This invention is a continuation-in-part of my pending application Serial No. 18,006 filed April 24, 1935, and the invention relates to signaling devices for motor vehicles and more particularly to such devices for use on automobiles of the closed type.

One of the main objects of the invention resides in a signaling device for use upon motor vehicles of the closed type by which the driver of such a motor vehicle may conveniently signal his intention to turn, to come to a sudden stop, or to execute other such movements of the vehicle.

Another feature of the invention is to provide a signaling device which includes a signal arm normally disposed in an out of the way position flat against the side of the motor vehicle, but which arm may be actuated from within the vehicle to rapidly move the same to a signaling position to extend outwardly from the side of the vehicle to forewarn drivers of approaching vehicles, both front and rear, that the driver of the vehicle equipped with the signal contemplates a turn or other unexpected action.

A further feature of the invention is the provision of a signaling device which is effective both during day and night driving without the use of direct lighting means.

A further object is the provision of a signaling device which may be applied to various makes of motor vehicles by one unskilled in the art, and which when applied, is neat in appearance so as not to detract from the appearance of the motor vehicle.

A still further object of the invention is the provision of a signaling device which is simple, sturdy and inexpensive of construction, positive of operation by a minimum effort on the part of an operator, and which is visible by the operator of a motor vehicle when in a signaling position, so that the operator may positively know that the device is in operating condition.

With these and other objects in view, the invention resides in the certain novel construction, combination and arrangement of parts, the essential features of which are hereinafter fully described, are particularly pointed out in the appended claims, and are illustrated in the accompanying drawings, in which:

Figure 1 is a fragmentary side elevational view looking at the left side of a motor vehicle of the closed type, and illustrating the improved signaling device thereon, the signal arm being shown in non-signaling position.

Figure 2 is a fragmentary front elevational view showing the signal arm in signaling position in full lines and in non-signaling position in dotted lines.

Figure 3 is a vertical transverse sectional view through the body of the motor vehicle showing the signaling arm in non-signaling position in full lines, and in signaling position in dotted lines.

Figure 4 is a vertical transverse sectional view on the line 4—4 of Figure 1.

Figure 5 is a detail vertical sectional elevational view of the signal mounting.

Figure 6 is a detail perspective view of the bushing and keeper element.

Figure 7 is a vertical sectional view on the line 7—7 of Figure 4.

Figure 8 is an outside elevational view showing the signal arm in signaling position in full lines and in non-signaling position in dotted lines.

Figure 9 is an enlarged fragmentary rear elevational view of the signaling device in signaling position, but showing the side of the motor vehicle in section.

Figure 10 is a view similar to Figure 9, but showing the same on a smaller scale to indicate the outer end of the signal arm and the full length of the actuating shaft.

Referring to the drawings by reference characters, the numeral 10 designates a tubular sleeve or bushing which is externally screw threaded at its inner end as at 11, the opposite or outer end rigidly supporting a keeper element 12. The keeper element 12 includes a flat disk head 13 which is fixed to one end of the sleeve 10 and from which an end wall 14 extends outwardly. Integral with the wall 14 and substantially parallel to the outer face of the flat head 13, is a front vertical wall 15, the end of which terminates in a substantially right angularly outwardly extending cam lip 16, the joinder between the lip and the wall 15 being rounded and both the lip and wall constitute a cam surface for the purpose to be presently explained. Extending outwardly from the flat head 13 is a stop finger 17.

In use of the signaling device upon an automobile of the closed type such as shown at A, the sleeve 10 is inserted inwardly through an opening 18 in the side wall or pillar 19 of the body of the motor vehicle and preferably at the left side thereof. Interposed between the flat head 13 and the outer adjacent surface of the side wall 19 of the vehicle is a rubber yieldable washer 20 and fitting over the sleeve 10 and abutting the inner side of the wall 19 is a spacing sleeve 21, the threaded end 11 of the bearing sleeve 10 extending beyond the inner end of the sleeve 21 and having threaded thereon, a clamping nut 22. By tightening the nut 22 against the inner end of the washer 21 the head 13 will be drawn tightly against the rubber washer 20 and the sleeve 10 will be held rigid against turning with the keeper member 12 held in the set position shown in the several figures of the drawings.

The parts of the signaling device hereinbefore described constitute a fixed unit when applied as stated, while the parts now to be described constitute a movable unit which has its bearing in the stationary unit.

Journaled for turning movement in the sleeve 10 and extending beyond opposite ends thereof, is a shaft 23, the inner end of which extends a considerable distance beyond the inner end of the sleeve 10 whereas the outer end of the shaft projects slightly beyond the flat head 13 and has a bracket 24 fixedly connected thereto. The bracket 24 comprises a flat semi-circular shaped body 25 having an inwardly extending hub for connecting the bracket to the shaft and from which body spaced ears 26 extend. The rounded top portion of the body 25 is provided with a shoulder 27 for engagement with the stop finger 17 for the purpose of limiting movement of the bracket in one direction.

Carried by the bracket 24 is a flat signal arm 28, the inner end of which is provided with spaced ears 29 disposed in axial alinement with the ears 26 and passing through the alined ears is a hinge pivot 30. A spring 31 encircles the pivot 30, one end of the spring bearing against the inner end of the signal arm 28 while the other end of the spring engages the bracket 24. The action of the spring normally urges the signal arm to an extended position at right angles to the outer flat face of the body 25 of the bracket 24.

The signal arm 28 is preferably constructed of flat thin sheet metal cut in the shape of an arrow, the pointed end of which is disposed at the outer end of the signal arm. If desired, the outer side of the signal arm which is the front side when the signal arm is in signaling position may be painted a color similar to the color of the automobile on which the signal is installed, whereas the opposite side which is disposed rearwardly when the signal arm is in signaling position, may be nickel plated and provided with raised portions or dots 32, which surface may be covered with transparent red celluloid 33 held in place by flanges 45 bent from the sides of the arm and which produces the outline of an arrow as shown in Figure 10, the center portion of the red celluloid being painted white as at 34.

The movable unit of the signaling device is secured in position by positioning a washer 35 on the shaft 23 in abutting engagement with the inner end of the sleeve 10. A spring 36 encircles the shaft 23 and one end abuts the washer 35, while the other end abuts a washer 37 spaced from the washer 35 and held by the spring against a removable cotter pin 38 which passes transversely through an opening in the shaft 23. The spring 36 places an inward tension upon the shaft and causes the hub of the bracket 24 to normally abut the flat head 13.

The inner end of the shaft 23 has a flat side 39, and fitted to the flat side of the shaft is the bearing 40 of a handle member 41. A set screw 42 threads through the bearing 40 and the inner end thereof engages the flat surface 39 on the shaft 23. By this means, the handle 41 may be adjustably keyed to the shaft 23 within reach of an operator of a motor vehicle when seated behind the steering wheel of such vehicle as shown in Figure 3 of the drawings.

Normally, the flat signal arm 28 is disposed in a vertical position close to the side of the motor vehicle with the side edges facing forwardly and rearwardly, the signal arm being held against accidental movement by a teat 43 extending inwardly from the front wall 15 of the keeper member and which is received in a semi-circular recess 44 provided at the inner end of the signal arm 28. When in this position, the lever 41 is down and the inner end of the signal arm 28 is bearing against the wall 15 of the keeper member 12. Assume that it is desired to actuate the signaling device to give a signal to the driver of approaching vehicles either from the rear or from the front, the operator grasps the handle member 41 and pulls upwardly thereon, to turn the shaft 23 one quarter revolution which causes the bracket 24 to turn and by reason of the fact that the signal arm 28 is hinged to the bracket 24, the signal arm travels therewith, but the spring 31 is tending to cause the signal arm to swing to a position at right angle to the flat body 25 of the bracket. This tension of the signal arm is restrained by the keeper member but the cam surface thereon gradually releases the same. After a complete actuation of the handle 41, the signal arm 28 clears the cam surface of the keeper member and is free to swing to the full open position shown in Figure 2 of the drawings where it extends horizontally from the side of the vehicle with the flat sides of the arm facing forwardly and rearwardly. Although the full movement of the shaft to operate the signal arm to signaling position is approximately one quarter revolution, it is only necessary for the operator to impart a slight movement to the handle 41 for after the signal arm clears the curved corner between the lip 16 and the front wall 15, the spring 31 will effect a final movement of the signal arm to signaling position. The shoulder 27 striking the stop 17 limits the turning movement of the bracket 24 during movement of the signal arm to signaling position, and when in signaling position the inner front side of the signal arm is in abutting engagement with the top portion of the lip 16 as best seen in Figures 8 and 9.

To move the signal arm from signaling position to non-signaling position, it is only necessary for the operator to grasp the handle member 41 and push downwardly thereon to impart a one-quarter return movement to the shaft 23, whereupon the cam surface of the keeper member 12 will swing the signal arm to the position shown in full lines in Figures 1, 3, 4, and 7. When the signal arm 28 reaches the limit of its movement to non-signaling position, the teat 43 enters the recess 44, thus any vibration of the vehicle will not swing the signal arm from the keeper.

By constructing the rear side of the signal arm 28 in the manner hereinbefore described, the signal arm will be readily visible from the rear during night driving, for the headlights of an approaching vehicle from the rear will illuminate the signal arm and the same will display the outline of a red arrow.

The spring 36 tends to impart an inward pull upon the shaft 23, the said shaft being slidable through the sleeve 10 whereby the shaft has axial yielding movement to take up slack which may be caused by wear between the parts.

While I have shown and described what I consider to be the most practical embodiment of my invention, I wish it to be understood that such changes as come within the scope of the appended claims may be resorted to if desired.

Having thus described the invention, what I claim as new and desire to secure by Letters Patent of the United States, is:—

1. A signaling device for motor vehicles comprising in combination, a rotatable shaft, a signal arm, spring hinge means secured to said shaft and connecting said signal arm with one end of said shaft to cause said arm to turn with said shaft and to normally swing relative thereto, and a guide cam fixed relative to said shaft and engaging with the inner end of said signal arm for guiding said signal arm to signaling and non-signaling positions during turning movements of said shaft.

2. A signaling device for motor vehicles comprising in combination, a rotatable shaft, a bearing therefor and through which said shaft extends, a head fixed to the outer end of said shaft, a flat signal arm hingedly connected to said head, spring means acting upon said signal arm to urge the same to swing outwardly, a keeper member engageable by said signal arm for restraining the outward swinging movement of said signal arm when the same is in a vertical non-signaling position, and cam guide means on said keeper member engageable by the inner end of said signal arm for gradually releasing said signal arm to a horizontal signaling position during turning of said shaft in one direction and for causing said signal arm to enter said keeper member during turning of said shaft in an opposite direction.

3. A signaling device for motor vehicles comprising in combination, a shaft, a bearing therefor and through which said shaft extends, a head fixed to the outer end of said shaft, a flat signal arm hingedly connected to said head, spring means acting upon said signal arm to urge the same to swing outwardly, a keeper member for restraining the outward swinging movement of said signal arm when the same is in a vertical non-signaling position, and cam guide means on said keeper member for gradually releasing said signal arm to a horizontal signaling position during turning of said shaft in one direction and for causing said signal arm to enter said keeper member during turning of said shaft in an opposite direction, and releasable interlocking means on said keeper member and said signal arm for holding said signal arm against accidental movement when in non-signaling position.

4. A signaling device for attachment to motor vehicles of the closed type comprising in combination, a tubular bearing adapted to extend beyond opposite sides of the side wall of the body of a motor vehicle, means carried by said bearing for fixedly securing the same in position upon a motor vehicle, a rotatable shaft extending through said bearing beyond opposite ends thereof, an actuating handle fixed to one end of said shaft, a head on the other end of said shaft, a flat signal arm having its inner end hingedly connected to said head, spring means acting upon said signal arm to swing the same outwardly, a keeper member fixedly carried by said bearing and engageable with said signal arm for restraining swinging movement of said signal arm when in a vertical non-signaling position, and cam means on said keeper member engageable with the inner end of said signal arm for gradually releasing said signal arm when said shaft is turned in a direction to move the signal arm to a horizontal signaling position, and for guiding said signal arm into said keeper upon turning movement of said shaft to move said signal arm to a vertical non-signaling position.

5. A signaling device for attachment to motor vehicles of the closed type comprising in combination, a tubular bearing adapted to extend beyond opposite sides of the side wall of the body of a motor vehicle, means carried by said bearing for fixedly securing the same in position upon a motor vehicle, a shaft extending through said bearing beyond opposite ends thereof, an actuating handle fixed to one end of said shaft, a head on the other end of said shaft, a flat signal arm hingedly connected to said head, spring means acting upon said signal arm to swing the same outwardly, a keeper member fixedly carried by said bearing for restraining swinging movement of said signal arm when in a vertical non-signaling position, and cam means on said keeper member for gradually releasing said signal arm when said shaft is turned in a direction to move the signal arm to a horizontal signaling position, and for guiding said signal arm into said keeper upon turning movement of said shaft to move said signal arm to a vertical non-signaling position, means for limiting turning movement of said shaft in opposite directions, and means for limiting the outward swinging movement of said signal arm to signaling position under the action of said spring means.

6. A signaling device for motor vehicles comprising a tubular bearing adapted to be fixedly secured transversely in the side of the body of a motor vehicle, a shaft journaled within said bearing and extending beyond opposite ends thereof, a signal arm, hinge means connecting said signal arm with the outer end of said shaft, spring means acting to swing said signal arm to a position substantially parallel to said shaft, an actuating handle on the inner end of said shaft, and a cam guide fixedly carried by the outer end of said bearing member and engaged by said signal arm for guiding said signal arm from a depending vertical non-signaling position to a horizontal signaling position and vice-versa, during the turning movements manually imparted to said shaft, by actuation of said handle by an operator.

7. In combination, a motor vehicle having a closed body, a shaft journaled in a side wall of said body and extending beyond opposite sides thereof, an actuating handle fixed to the inner end of said shaft, a head fixed to the outer end of said shaft, a flat signal arm hinged to the head, spring means acting to normally swing said signal arm outwardly, a fixed keeper member engageable with said signal arm for normally restraining the outward swinging movement of said signal arm, and cam means on said keeper member engageable with the inner end of said signal arm for gradually releasing said signal arm to enable said signal arm to swing to a signaling position substantially parallel to said shaft when the shaft is manually turned to signal operating position, said cam means also guiding said signal arm to a vertical non-signaling position substantially parallel to the side of the body during turning movement of the shaft to non-signal operating position.

8. A signaling device for motor vehicles comprising in combination, a fixed sleeve bushing, a keeper member on the outer end of said bushing, a rotatable shaft journaled and slidable in said bushing and extending beyond opposite ends thereof, a head on the outer end of said shaft, spring means acting upon said shaft to hold the head against the outer end of said bushing, a handle on the inner end of said shaft, a signal arm hingedly connected to said head, spring means acting to urge said signal arm outwardly, and a cam guide on said keeper member engageable with the inner end of said signal arm for releasing said signal arm to signaling position upon turning of said shaft in one direction, and for guiding said signal arm into said keeper member against the action of said last spring means upon turning said shaft in an opposite direction.

HECTOR C. BRANCATI.